United States Patent [19]
Le Letty et al.

[11] Patent Number: 5,648,696
[45] Date of Patent: Jul. 15, 1997

[54] PIEZOELECTRIC MOTOR WITH PROGRESSIVE WAVE

[75] Inventors: Ronan Le Letty, Combrit; Frank Claeyssen; Nicholas Lhermet, both of Meylan; Paul Gonnard, Villeurbanne; Marie-Madeleine Guillemot-Amadei, Villeurbanne; Laurent Lebrun, Villeurbanne, all of France

[73] Assignee: Figest B.V., Netherlands

[21] Appl. No.: 591,459

[22] PCT Filed: Aug. 17, 1994

[86] PCT No.: PCT/EP94/02732
§ 371 Date: Jan. 31, 1996
§ 102(e) Date: Jan. 31, 1996

[87] PCT Pub. No.: WO95/05682
PCT Pub. Date: Feb. 23, 1995

[30] Foreign Application Priority Data

Aug. 18, 1993 [FR] France ................. 93 10086

[51] Int. Cl.⁶ ........................................ H01L 41/08
[52] U.S. Cl. ........................................ 310/323
[58] Field of Search ........................ 310/323, 328

[56] References Cited

U.S. PATENT DOCUMENTS

| | | | |
|---|---|---|---|
| 4,513,219 | 4/1985 | Katsuma et al. | 310/328 |
| 4,562,373 | 12/1985 | Tokusima et al. | 310/328 |
| 4,562,374 | 12/1985 | Sashida | 310/328 |
| 4,935,659 | 6/1990 | Naka et al. | 310/328 |
| 4,937,488 | 6/1990 | Fujie et al. | 310/323 |
| 4,950,135 | 8/1990 | Tojo et al. | 310/323 X |
| 5,554,905 | 9/1996 | Gschwind et al. | 310/323 |
| 5,585,685 | 12/1996 | Maeno et al. | 310/323 |

FOREIGN PATENT DOCUMENTS

| | | |
|---|---|---|
| 0569673 | 11/1993 | European Pat. Off. . |
| WO91/11850 | 8/1991 | WIPO . |

*Primary Examiner*—Mark O. Budd
*Attorney, Agent, or Firm*—Laff, Whitesel, Conte & Saret, Ltd.

[57] ABSTRACT

Traveling-wave piezoelectric motor comprising at least one rotor (20, 21), at least one annular stator (27, 28) and two groups of piezoelectric elements (29) dispersed around the stator, in permanent contact with the stator and excited by an alternating current with a π/2 phase shift between the groups so as to produce, at the surface of the stator, a traveling wavelike deformation. Piezoelectric elements consist of mutually independent polarized ceramic bars (29) arranged perpendicularly to the stator and each connected to the stator by an articulation (14).

11 Claims, 2 Drawing Sheets

PIEZOELECTRIC MOTOR WITH PROGRESSIVE WAVE

FIELD OF THE INVENTION

The subject of the present invention is a traveling-wave piezoelectric motor comprising a stator, consisting of an annular elastic body, two groups of piezoelectric elements dispersed around the stator, in permanent contact with the stator and excited by an alternating current with a 90° phase shift between the groups so as to produce, at the surface of the stator, a traveling wavelike deformation, and a rotor in the form of a disk held elastically in contact with the stator for the rotational driving thereof by the traveling wave produced on the stator.

PRIOR ART

The principle of the construction and operation of such a motor is described in detail in the U.S. Pat. No. 4,562,374. So as to produce a traveling wave on the stator, the two groups of piezoelectric elements are supplied with a voltage of like frequency but phase-shifted in time by an angle $\pi/2$ and the groups are arranged on the stator in such a way that the standing waves generated by each of the groups are shifted in space by $\lambda/4$, $\lambda$ being the wavelength of the standing waves. The groups of piezoelectric elements can be separated from one another or nested, the piezoelectric elements of the two groups then being intercalated so that there is alternately a piezoelectric element from each group. The motors described in U.S. Pat. No. 4,562,374 are made with ceramic wafers, in the shape of a segment of an annulus, these wafers being adhesively bonded to the stator thereby forming a complete annulus or portions of an annulus, depending on whether the groups are or are not nested.

Motors of like design are described in the U.S. Pat. No. 4,562,373. So as to increase the effectiveness of such motors, two rings of nested piezoelectric elements are superposed and supplied with an appropriate phase shift.

The U.S. Pat. No. 4,513,219 describes motors of electrostrictive type in which the electrostrictive elements likewise consist of wafers pressed against a stator.

It is therefore noted that in general piezoelectric elements have been used in the form of thin wafers so as to adapt to the undulation of the stator. These wafers function in 3.1 mode, that is to say they expand and contract in a direction perpendicular to the applied electric field. The amplitude of the deformation in the 3.1 mode is relatively small and this is precisely why it was proposed in the U.S. Pat. No. 4,562,373 to superpose two systems of wafers so as to increase the effectiveness of the motor. Furthermore, the ceramics used are fragile parts with complex shapes, and they require elaborate tooling for manufacture, polarization and handling which moreover are often specific to each ceramic. They are therefore expensive to implement and poorly suited to mass production.

SUMMARY OF THE INVENTION

The purpose of the present invention is to propose a traveling-wave piezoelectric motor which is robust, effective and of advantageous manufacturing cost.

For this purpose, the piezoelectric motor according to the invention is such that the piezoelectric elements are mutually independent polarized ceramic bars arranged perpendicularly to the stator and each connected to the stator by an articulation.

The use of bars functioning perpendicularly to the stator, makes it possible to function in 3.3 mode, at their natural resonant frequency, and this makes it possible to benefit from a high electromechanical coupling factor and hence to obtain at constant electric field, deformations around three times greater than the levels obtained in motors according to the prior art. High axial mechanical rigidity is moreover obtained.

Ceramic bars are relatively tough elements and therefore do not require special precautions for their implementation. The ceramic bars may be standard commercial parts, such as the ceramic bars of gas and cigarette lighters produced cheaply in very large quantity.

The bars make it possible furthermore to more easily make nested systems in which the piezoelectric elements of each group are dispersed around the entire circumference of the stator.

The use of bars whose end would be bonded to the stator of the prior art would pose a problem. Indeed, the stator undergoes an undular deformation which would interfere with the axial deformation of the bars and would not allow correct operation of the stator and hence of the motor. This problem has been specifically solved by connecting the bars to the stator by an articulation allowing the bars to remain substantially in a position perpendicular to the rest plane of the stator. In one embodiment, the articulations are made in the form of the narrowing of axial protuberances of the stator to the ends of which are fixed the ceramic bars, by adhesive bonding for example.

By means of dual-polarization bars it is possible to make a motor with two stators and two coaxial rotors and thus to double the power of the motor. Moreover, the immobilizing of the stator at the vibration node is made easier, as is the electrical supply.

BRIEF DESCRIPTION OF THE DRAWINGS

The appended drawing represents, by way of example, embodiments of the motor according to the invention.

DESCRIPTION OF THE PREFERRED EMBODIMENT

Figure 1:
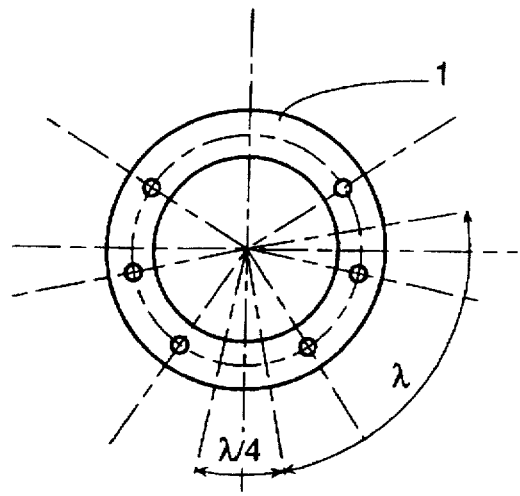
FIG. 1 is a diagrammatic plan view of a stator with its piezoelectric exciters.
Figure 2:
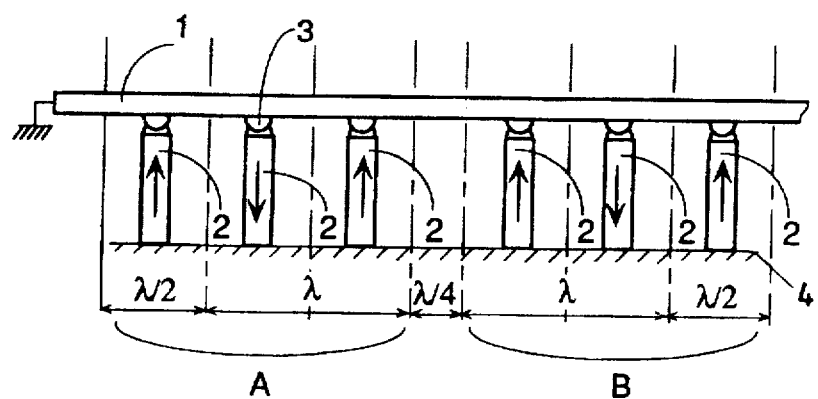
FIG. 2 is a developed view of the stator of FIG. 1.

FIGS. 1 and 2 represent a flat ring-shaped stator 1 to which two groups A and B of polarized ceramic bars 2 are connected by articulations 3. The arrows indicate the direction of polarization of the bars. It can be seen that these bars have alternate polarization in each of the groups. The groups A and B are supplied with similar electrical voltages, of like frequency equal to the natural resonant frequency of the bars, but mutually phase-shifted by an angle $\pi/2$. The two groups A and B are arranged around the circumference of the stator in such a way that the standing waves generated by each of the groups are shifted in space by $\lambda/4$, as indicated in the drawing, λ being the wavelength of the standing waves. In each of the groups, the bars are arranged around the stator 1 a distance equal to λ/2 apart. In FIG. 2, the λ/2 and λ segments indicate the position of the standing waves.

Figure 3:
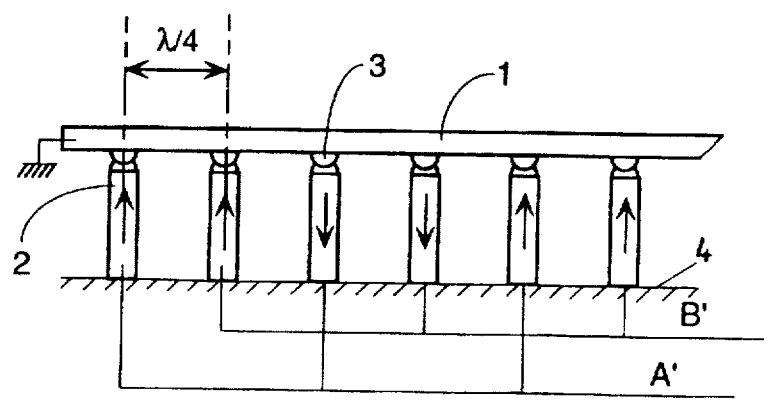
FIG. 3 represents diagrammatically a developed view of a stator according to a second embodiment.

FIG. 3 represents the same stator 1, developed, to which are connected, again by articulations 3, polarized ceramic bars 2 dispersed into two groups A' and B' supplied in the same manner as groups A and B, these groups here being nested so that around the circumference of the stator there is alternately a bar from group A' and a bar from group B'. The arrows again indicate the direction of polarization of the bars. In this case, the bars 2 are dispersed uniformly around the whole of the circumference of the stator 1, a distance equal to λ/4 apart.

Figure 4:
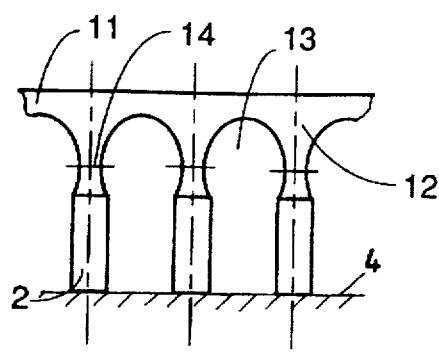
FIG. 4 represents another embodiment of the articulations of the ceramic bars or stator.

FIG. 4 represents an unfolded annular stator portion 11. This stator has protuberances 12 parallel to the axis of the stator and regularly dispersed around the circumference of the stator. The protuberances 12 delimit between them notches 13 of substantially elliptical shape such that the protuberances 12 have a narrowing 14 permitting bending of the protuberances in this region and thus forming an articulation for the ceramic bars 2 fixed to the end of these protuberances, for example by adhesive bonding.

Figure 5:
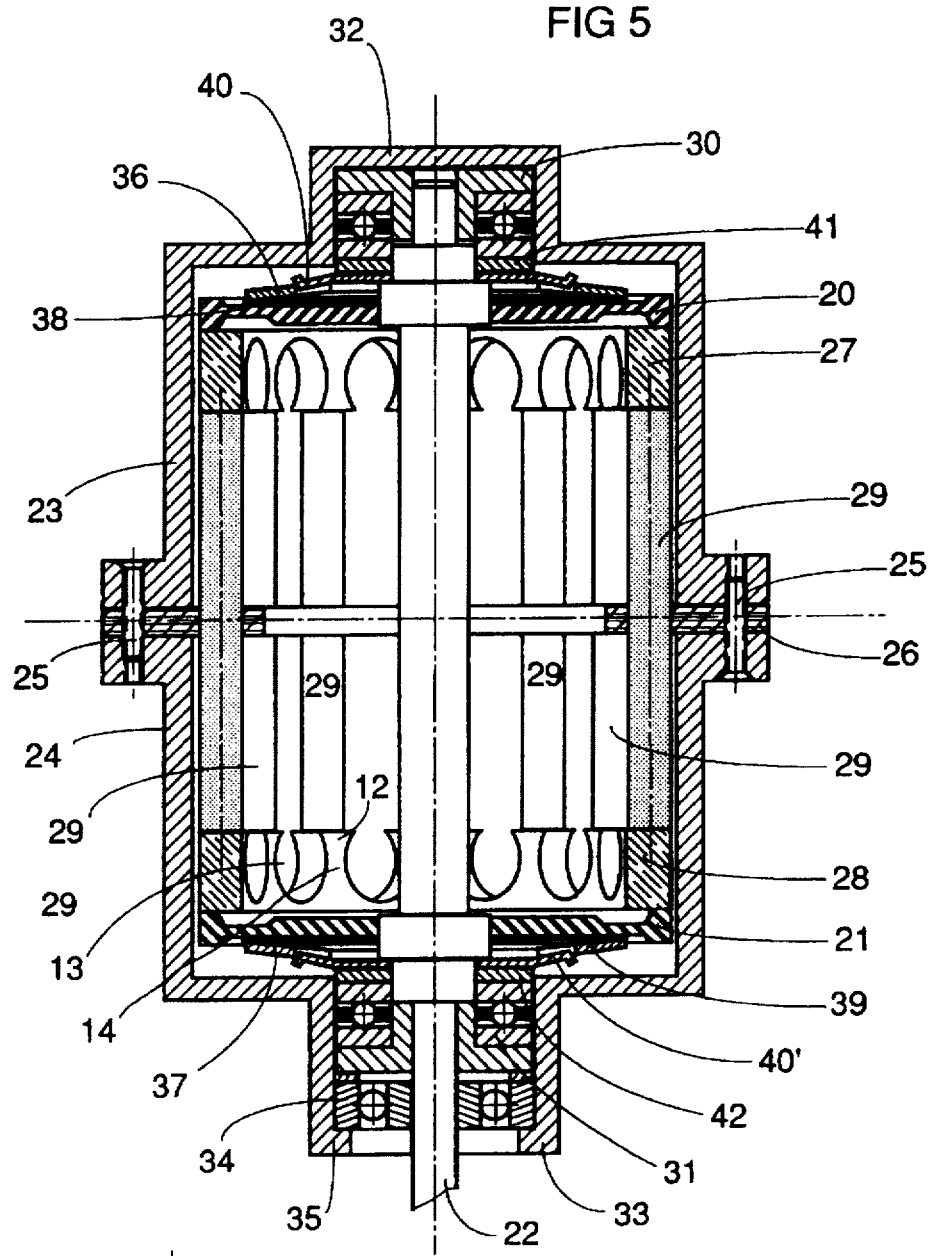
FIG. 5 is an axial sectional view through a two-rotor motor constructed according to the principle represented in FIG. 4.

A practical illustrative embodiment of the motor is represented in FIG. 5.

Figure 6:
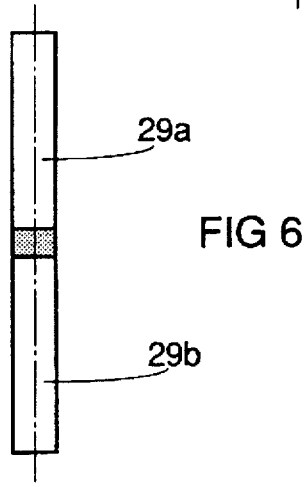
FIG. 6 represents a dual-polarization bar such as used in the motor according to FIG. 5.

This motor comprises two rotors 20 and 21 in the form of disks set onto a shaft 22 mounted by way of ball thrust-bearings in a casing consisting of two half-shells 23 and 24 furnished with flanges via which they are assembled by means of screws 25 with interposition of a part 26 made from synthetic material, in the form of a disk serving as support for a dual-stator drive system mounted between the rotors 20 and 21 and comprising a first annular stator 27 for driving the rotor 20 and a second stator 28 for driving the rotor 21. The stators 27 and 28 are connected together by dual-polarization bars 29. Such a bar is represented in FIG. 6. It consists of two bars 29a and 29b adhesively bonded in polarity opposition by one of their ends or by a single bar 29, polarized in both directions from a single electrode, of annular shape, arranged at the middle thereof. These bars 29 are supported by the disk 26 and arranged and supplied as described in conjunction with FIG. 3. They are connected to the stators 27 and 28 as represented in FIG. 4, the labels 12, 13, 14 referring back to FIG. 4.

The stators and the bars constitute a cage reminiscent of a squirrel cage.

The axial prestress of the rotors 20 and 21 is obtained automatically by assembling the two half-shells 23 and 24 of the casing. This prestress is exerted between two axial ball bearings 30 and 31. The ball bearing 30 is housed in a cup 32 formed in the bottom of half-shell 23, while the ball bearing 31 is housed in a cylindrical sleeve 33 prolonging the half-shell 24. It is retained axially by a radial ball bearing 34 itself abutting against a rim 35 of the sleeve 33. The prestress is achieved by elastic washers 36 and 37, of the Belleville washer type, mounted between each of the rotors and the corresponding ball bearing. Sheets of rubber 38 and 39 respectively are arranged between the elastic washers 36 and 37 and the rotors, and serve to damp the vibrations of the rotors. Between each of the elastic washers 36 and 37 and the corresponding bearing is mounted a washer 40, respectively 40' and a metal washer 41, respectively 42 constituting a shim. The shims specifically make it possible automatically to obtain the necessary prestress when closing the casing of the motor by assembling its half-shells 23 and 24.

We claim:
1. A traveling-wave piezoelectric motor comprising a stator (1; 27, 28) consisting of an annular body, two groups (A, B; A', B') of piezoelectric elements (2; 29) dispersed around the stator, in permanent contact with the stator and excited by an alternating current with a π/2 phase shift between the groups so as to produce, at the surface of the stator, a traveling wavelike deformation, and a rotor (20, 21) in the form of a disc held elastically in contact with the stator for the rotational driving thereof by the traveling wave produced on the stator, wherein the piezoelectric elements are mutually independent polarized ceramic bars (2; 29) arranged perpendicularly to the stator, that is to say parallel to the axis of the motor, and each connected to the stator by an articulation (3; 14).

2. The piezoelectric motor as claimed in claim 1, wherein the stator (1; 27, 28) has protuberances (12) directed towards the piezoelectric elements and wherein the piezoelectric elements (2) are fixed to the end of these protuberances, these protuberances having an intermediate narrowing (14) forming an elastic articulation.

3. The piezoelectric motor as claimed in claim 2, wherein the bars (2; 29) are arranged regularly around the whole of the circumference of the stator and wherein the corresponding protuberances (12) of the stators delimit between them notches (13) of substantially elliptical shape.

4. The piezoelectric motor as claimed in claim 1, wherein it comprises two coaxial rotors (20, 21) associated with two stators (27, 28) mounted between the rotors and dual-polarization ceramic bars (9) arranged between the stators, and the ends of which are connected to each of the stators respectively.

5. The piezoelectric motor as claimed in claim 4, wherein the piezoelectric elements (29) and the stators (27, 28) form a cylindrical cage between the rotors and wherein the rotors (20, 21) are set onto a shaft (22) mounted between two axial ball bearings (30, 31) and held against the stators by prestressed elastic elements (36, 37) mounted between each of the bearings and the rotors.

6. The piezoelectric motor as claimed in claim 4, wherein the dual-polarization ceramic bars (29) consist of two bars (29a, 29b) adhesively bonded in polarity opposition by one of their ends.

7. The piezoelectric motor as claimed in claim 4, wherein the dual-polarization ceramic bars (29) consist of a single bar polarized in both directions from a single electrode of annular shape arranged at the middle thereof.

8. The piezoelectric motor as claimed in claim 2, wherein it comprises two coaxial rotors (20, 21) associated with two stators (27, 28) mounted between the rotors and dual-polarization ceramic bars (9) arranged between the stators, and the ends of which are connected to each of the stators respectively.

9. The piezoelectric motor as claimed in claim 3, wherein it comprises two coaxial rotors (20, 21) associated with two stators (27, 28) mounted between the rotors and dual-polarization ceramic bars (9) arranged between the stators, and the ends of which are connected to each of the stators respectively.

10. The piezoelectric motor as claimed in claim 5, wherein the dual-polarization ceramic bars (29) consist of two bars (29a, 29b) adhesively bonded in polarity opposition by one of their ends.

11. The piezoelectric motor as claimed in claim 5, wherein the dual-polarization ceramic bars (29) consist of a single bar polarized in both directions from a single electrode of annular shape arranged at the middle thereof.

* * * * *